US005624638A

United States Patent [19]
Negrotti

[11] Patent Number: 5,624,638
[45] Date of Patent: Apr. 29, 1997

[54] MODULAR LABORATORY EQUIPMENT AND COUPLING SYSTEM

[75] Inventor: David F. Negrotti, Uxbridge, Mass.

[73] Assignee: Davcotech, Inc., Linwood, Mass.

[21] Appl. No.: 316,959

[22] Filed: May 5, 1994

Related U.S. Application Data

[63] Continuation of Ser. No. 57,732, May 5, 1993, abandoned.

[51] Int. Cl.$^6$ ........................................................ B01L 3/00
[52] U.S. Cl. ............................ 422/61; 422/99; 422/104; 422/130; 206/229; 206/230; 206/569
[58] Field of Search ........................... 422/61, 99, 104, 422/130; 206/229, 230, 569

[56] References Cited

U.S. PATENT DOCUMENTS

| | | | |
|---|---|---|---|
| 3,348,921 | 10/1967 | Katz et al. | 422/61 |
| 3,667,785 | 6/1972 | Kapeker | 285/231 |
| 4,195,059 | 3/1980 | Witcher et al. | 422/61 |
| 4,303,610 | 12/1981 | Sandisco et al. | 422/61 |
| 4,617,278 | 10/1986 | Reed | 422/61 |
| 5,087,422 | 2/1992 | Friese et al. | 422/61 |
| 5,100,621 | 3/1992 | Berke et al. | 422/61 |

*Primary Examiner*—Jill Warden
*Assistant Examiner*—Sharidan Carrillo
*Attorney, Agent, or Firm*—Thomas A. Kahrl, Esq.

[57] ABSTRACT

A personal, miniaturized, multipurpose test kit for performing a plurality of chemical tests and procedures, which include interchangeable multifunctional elements connecting adapted for arrangement of multiple test configurations including a portable container, at least one component body element adapted for providing a reactor reservoir, at least one access cap, a coupling device for coupling multiple components, fasteners typically pop in-pop out fastening devices all constructed of impact proof, damage resistant material, adapted to perform experiments using small amounts of solvents and samples while preserving the accuracy precision and manual control, wherein a plurality of test modules may be rapidly selectively set up to conduct a plurality of procedures and tests including pressure-volume, titration, precipitation, density, electro-chemistry, (galvanic or voltaic), chromatography, viscosity, diffusion wherein liquid or gas, molecular weights, melting points, boiling points, thermodynamics, solid gas and/or liquid reactions in static or flowing streams. Further including the method for connecting the elements of the test kit to provide for arrangement of multiple test configurations. Included in the test kit is a solvent dispenser, a minitrator dispensing element with a pop-in pop-out fastening technology, and array of components employing a unique o-ring seat and seal apparatus, employed in cooperation with reactor caps and tube joints.

13 Claims, 12 Drawing Sheets

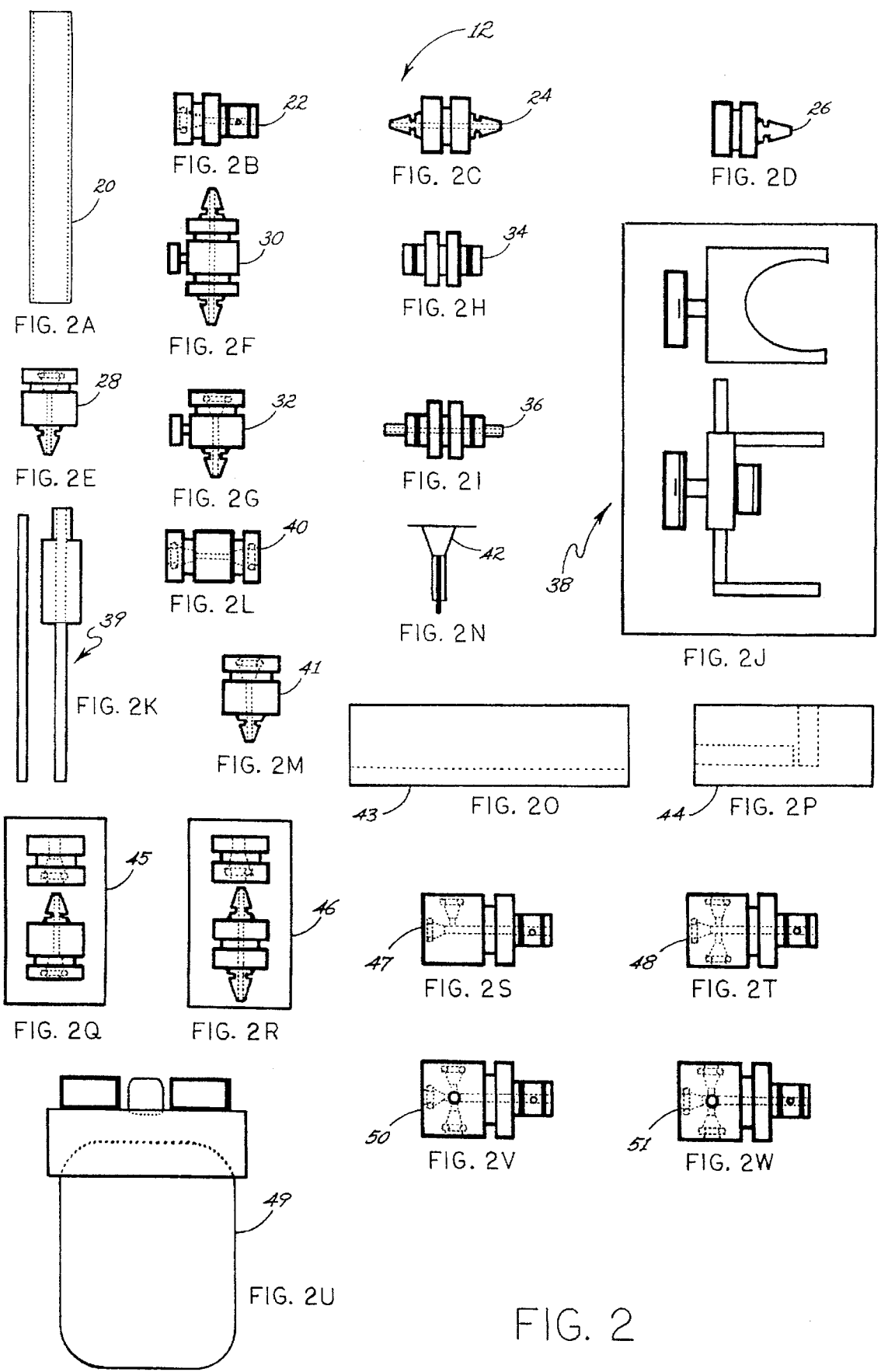

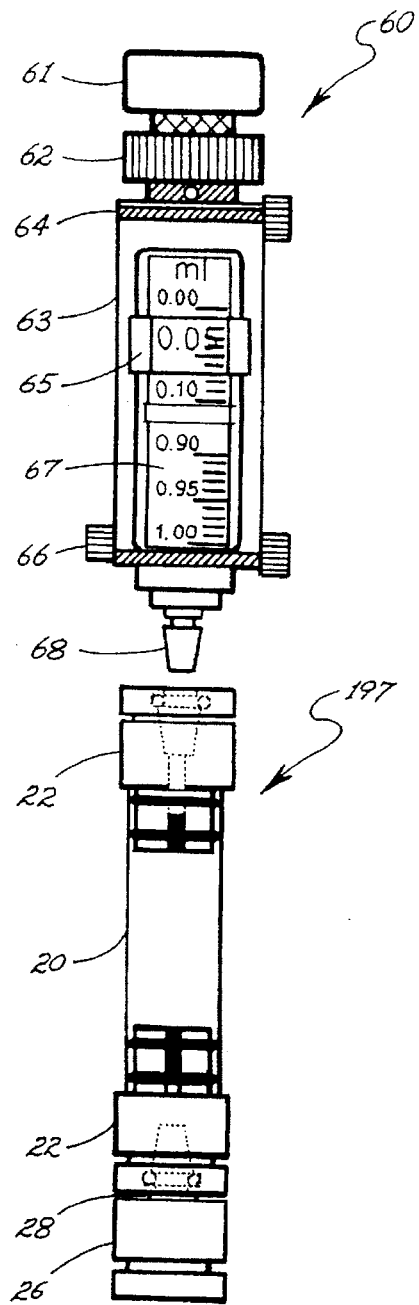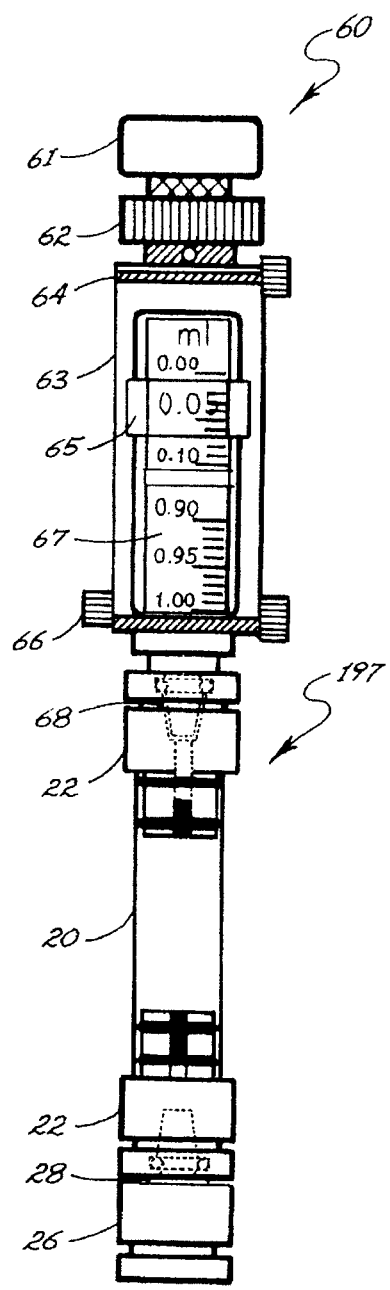
FIG. 17A
FIG. 17B

MODULAR LABORATORY EQUIPMENT AND COUPLING SYSTEM

REFERENCE TO PRIOR APPLICATIONS

This application is a continuation of U.S. patent application Ser. No. 08/057,732 filed May 5, 1993, now abandoned entitled MINIATURIZED MULTIPURPOSE TEST KIT AND METHOD, hereby incorporated by reference in its entirety.

BACKGROUND OF THE INVENTION

The use of individual, small scale, test instruments, by students and scientists is important both to achieve savings in volumes and weights of solvents and samples used, particularly in universities, for cost savings, and also to be environmentally beneficial in that smaller amounts of refuse and waste material and refuse is generated. Very often, however, as instruments are reduced in scale to achieve such savings in volumes and weights, accuracy and ease of use is frequently sacrificed, or alternatively cost savings in material are lost due to increased cost of miniaturized instruments which outweigh the cost of material savings.

Furthermore, exposure to chemical material is now recognized to be injurious to health of scientists and students, and accordingly, it is important that laboratory equipment be designed to provide a closed or semi-closed laboratory climate, wherein physical contact with chemical solutions and vapors is held to a minimum.

Also for greater speed in setting up experimental experiments, and for greater clarity and better understanding, it is important for students to conduct individual procedures employing personal test kits for greater involvement in the procedures and the enumerated test steps in a closer proximity to observing the chemical reactions and results obtained therefrom.

Applicant is aware of prior art chemistry kits, particularly micro-organic chemistry kits which have been designed and furnished as single purpose systems. Furthermore, the components of these sets are difficult to manipulate due to their small size and are easily broken because they are made with ground glass joints. One such miniaturized biological assembly is covered by U.S. Pat. No. 5,200,152, to Brown, which discloses a miniature chamber assembly that provides a miniature capillary environment. Applicant is also aware of small scale laboratory test kits having a structure and a range which facilitates education of students, or alternatively, adapted for single purpose diagnostic testing. One such small scale laboratory kit is disclosed in U.S. Pat. No. : 3,348,921 to Katz et al., showing an integrated chemical laboratory having flasks and a beaker test tubes and a burette tube, and including a T-connector and valve. A similar test kit disclosed in U.S. Pat. No. 4,303,610 to Sardisco et al., covers a test kit for field analysis of plant tissue, the test kit configured to provide a test structure and arrangement for field use. With reference to diagnostic kits, U.S. Pat. No. 4,769,333 to Dole et al., discloses a disposable hand held diagnostic kit having a specimen support member and a plurality of liquid receptacles means for applying liquids to the support member.

However applicant has found that prior art devices fail to provide a test system for configuring a substantial number of test configurations, or incorporates a modular design adapted for forming a large number of test setups that is small scale, accurate, easy to operate and includes interchangeable parts which are constructed on impact-resistant material and are directed to providing environmentally beneficial savings of waste material including hazardous waste material.

Accordingly, it is desirable to provide for a personal, miniaturized laboratory test kit, which is adapted for multipurpose use and is configured for individually performing a plurality of chemical tests and procedures consisting of interchangeable, multifunctional connecting apparatus which is simple and effective to employ in the arrangement of multiple test configurations, which is economical, is adapted to use small volumes and weight quantities, is safer to use by employing a controlled laboratory environment, does not sacrifice manual control of the instruments and is sufficiently accurate for use in industry and in laboratory testing and to a method of arranging the apparatus to provide for multiple configurations of test stands.

SUMMARY OF THE INVENTION

The present invention relates to a miniaturized multipurpose test kit, associated component apparatus and method for arranging a plurality of test configurations. More particularly the invention is directed to a personal, miniaturized, multipurpose test kit for individually performing a plurality of chemical tests and procedures comprising interchangeable, multifunctional components, coupling elements and fastening devices.

It is another feature of the invention to provide for a multipurpose test kit having a miniaturized size and configuration directed to economical manufacture with high-impact material whose components being interchangeable, may be selectively replaced due to damage or wear at a much reduced cost.

A further feature of the invention is a modular configuration permitting mixing and matching of components in a plurality of test configurations such as: pressure-volume, titration, precipitation, density, electrochemistry, chromatography, viscosity, diffusion, molecular weights, melting points, boiling points, thermodynamics, solid gas and or liquid reaction.

Yet a further feature of the invention is a provision of a personal chemical test kit for off site use by students and scientists adapted for individual operation.

Yet a further feature of the invention is providing an environmentally beneficial test kit which greatly reduces waste material generated by chemical procedures.

The preferred embodiment of the present invention permits scientists and students to perform experiments using small amounts of solvents and samples while preserving the accuracy, precision, and manual control compared to conventional large scale laboratory equipment. The preferred embodiment employs small volumes and weight quantities which range form microliter to milliliters and from micrograms to grams quantities and so it is environmentally smart to use, reducing the amount of refuse by 50 to 3000 times the amount produced with conventional laboratory equipment.

As is shown in FIGS. 1 & 2, and a test kit is displayed including modular components adapted to be used as stand-alone items or can be mixed and matched to produce many experimental sub-systems, and which also can be linked together to form combinations of experimental systems. The number of experimental set-ups which can be assembled is almost limitless and so the present invention can be used to study such principals as Pressure-Volume (gas or liquid), Titration, Precipitation, Density, Electrochemistry (galvanic or voltaic), Chromatography, Viscosity, Diffusion (liquid or gas), Molecular Weights, Melting Points, Boiling Points, Thermodynamics, Solid, Gas and/or Liquid Reactions (in static or flowing streams). In addition, the components and sub-systems derived therein can be adapted to other kits, conventional glassware, and used in conjunction with computers controlled interfaces, and many types instruments and detection systems.

The present invention is designed to be safer to use compared to conventional laboratory equipment because the experimental sub-systems and solvent delivery systems are used in combination to produce a closed or semiclosed chemical climate, by creating the closed or semi-closed chemical climate, the present invention minimizes physical contact with chemical solutions and vapors compared to prior art existing and comparable technologies. Furthermore, the components of the present invention are durable, and less breakable, even when repeatedly dropped because these components are made from impact resistant materials such as Teflon, Nylon, Delrin, Polyethylene, Metals, Polypropylene, Acrylics, and others impact resistant material. The resistance to breakage by these components adds to the safety features such that the sharp points and cutting edges resulting from broken glass is eliminated. Also these materials attack breakdown in normal chemical and physical laboratory environments and can be made of other materials that suit more hostile conditions.

Notwithstanding the small scale of the test kit of the, manual control is not sacrificed for the reason that key features of the components are miniaturized rather than miniaturizing the entire embodiment. Many of the components of the preferred embodiment are comparable in size to macro-components. Furthermore, the preferred embodiment is configured such that components never need full replacement in normal use. Any components which wear out can be refurbished by replacing subcomponents such as o-rings, couplings, fasteners, tubes, plungers, and tips, rather than the components itself. Furthermore, components of the present invention and/or sub systems are portable, compact and easily transported into and out of the laboratory permitting off site use such as at home or in a college dormitory, because experiments are preformed in closed or semi-closed environments, and require very small amounts of chemicals.

The modular design of the present invention provides users with a faster, more efficient method to perform experiments compared with conventional laboratory apparatus. Experimental sub-systems can be quickly assembled, and experiments generally take less time with the miniaturized multi-function test kits. In order to help substantiate this claim, the benefit of the present invention, consider a minitrator subsystem component of the present invention which can be used as one milliliter titrator being about five times faster to use that the standard 50 ml. burette. In addition, the electrical sub-systems components of the present invention permit an experimenter to measure at least fifteen different electromotive potentials in a single hour as compared with a single measurement taking about two hours using conventional two beaker half cells and messy and hard to prepare salt bridges. In fact, because of the difficulty in setting up electromechanical systems, most high schools, colleges and universities experiments from their curriculum. An additional feature of this modular design is that the present invention may never need full replacement in normal use. Any components which wear out can be refurbished by replacing sub-components such as o-rings, tubes, coupling devices, fasteners, plungers, and tips rather than the component itself. A further advantage of the present invention can be seen from the fact that there are many experiments which can be done in the laboratory that would not likely be done using conventional apparatus in a university lab setting. For example, redox titrations are not commonly performed at the Freshman level in Colleges and Universities because a large volume quantities of strong oxidizing and/or reducing agent are required. These regents are too expensive to dispose and too dangerous to keep stored in the laboratory. Consider a student body who requires 50 liters of permanganate (redox agent) using standard 50 milliliter burettes. Under these same conditions, the preferred embodiment. Minitrator sub-system would require only 1 liter of solution.

In particular, as is seen in FIG. 7, the preferred embodiment incorporates a novel Nipple- socket Joint using Pop-In-Pop-Out Fastening Technology which is used to couple components or sub-system assemblies to provide an experimenter with a versatile, convenient, air and solvent tight, and secure method of linking and un-linking systems. The new joint design fits standard Luer couplings (male and female) however, the socket or female component retains a fitted o-ring which mates snugly into the grooved nipple or male component. As is seen in FIG. 7, an example of the Pop-In Pop-Out Fastening system which uses the nipple-socket joint. Specifically, a nipple of component B pops snugly into the socket of a component A while o-ring seals positioned in the socket fits snugly around the groove. This design provides a more secure joint compared to Luer Slip-Tip joints and are more convenient to assemble and dissemble than screw-in type or Luer Lok joints.

FIG. 7 illustrates an added feature of the joint formed by component A & B where a stem can be inserted inside of the nipple. This is an important feature because it permits the experimenter to fasten stems and small diameter cylinders of varying lengths and diameters inside, outside or through the joint. Several of the experimental sub-systems require this feature be used and for a variety of reasons such as for venting liquids and/or gases, binding chemical and/or biological materials, reaction substrates, catalysts, and poisons, electrical bridges, adding or removing liquids, agitation, nucleation, and connecting probes and microelectronic devices.

Referring to FIGS. 8 & 9, the reactor caps shown are an important attribute of the invention because these caps are used to couple reactor tubes to form a snug seal which is air and a solvent tight seal. In turn, the reactor cap-tube assembly couples the other components and subsystems by being fastened to the back side of the reactor caps. The reactor caps are made of Teflon and other materials and are available in a variety of shapes and sizes. The caps are generally but not necessarily fitted with two o-rings , one being located near the end of the insertion shaft and the other at the base. When the cap is fully inserted into the tube, the small access hole is closed to the environment and both rings form an air tight seal with the inner diameter of the tube. The o-ring positioned at the base of the shaft also serves to eliminate trapped solvent which can adversely affect the accuracy and precision of an experiment, particularly with small scale systems.

As is shown in FIG. 9, the small access hole or slot can be exposed to the environment by pulling the reactor cap back about one third way out as shown in FIG. 9, while the other o-rings keeps the tube snugly sealed with the cap. The small access hole is multipurpose in that it is used for venting liquids and/or gases, adding or removing small quantities as solids, and attaching small components such as thermocouples.

FIGS. 8 and 9 also shows the main access hole which is used as a port or for attaching small components such as thermocouples.

FIGS. 8 and 9 also shows the main access hole which is used as a port or for attaching components and/or subsystems. Components, stems, cylinder, and probes can be attached inside, outside, or through the large access hole into the tubes or other components. The back side of the large hole employs Pop-In Pop-Out Technology while the inside diameter varies and depends the users requirements. The main access hole can be placed through the central access or in any angle extending from 0° to 90° from the central access. In addition and as shown in FIG. 2a–w, a reactor cap can have several large access ports.

The reactor tubes, according to the present invention are designed and manufactured in square and cylindrical geometries having different diameters and lengths. The tubes are manufactured using a wide variety of materials such as acrylic and other plastics, glass, metals, paper, ceramics and composites. They are molded and/or cut to size by machining, grinding, slicing, and polishing to produce clean and smooth inner and outer edges to insure a proper fit with the mating reactor caps as shown in Drawing 1. All dimensions of the tube are held to tolerances which are less than or equal to + or − 0.005.

Many of the connecting components of the reactor set have a grooved ring as shown in FIGS. 1, 4, and 5, which accommodate adjustable and fixed lengthy clamps. They are used to fasten reactor caps to tubes, a component to other components, and sub-systems to other sub-systems. For most applications, the nipple-socket joints adequately secure the connections; however, under conditions of elevated pressures or when the connections need other reasons, a clamping mechanism, as is shown in FIG. 2a–w provides an excellent means to insure the components remain firmly linked together.

The o-rings employed in the present invention which are used for joining and connecting tubes and components come in a variety of sizes and materials. the size of the ring depends use in the various components and joints depend on the size of components and tubes. The material can be made of rubber, plastic polymers and composites.

Minitrators and Assemblies

As is shown in FIGS. 3 & 4, a plurality of multipurpose minitrator bodies depict the full scale optical mount and the pinch optical mount minitrators respectively. The full scale mount features a sliding optical lens which is mounted inside tow grooves on either side of the housing. The bottom screw located to the left hand side of the housing is used to secure the tube inside the mount while the screws on the right hand side are used to adjust the slide tension of the lens and to stop from sliding off the mount. Several types of tubes are made for different applications such as measuring volume, pressure, and vacuum and can be easily popped into or removed from the mount as required. Each type of tubes are appropriately marked and calibrated against standard test equipment and they are laminated and/or coated with materials to protect the markings against scuffing, scratching and chemical attack.

A pull stop valve is provided to vent the system for liquids or gases, and when the plunger is pulled to the stop position, the vent is open, while the vent is close when the plunger is positioned inside the tube.

As is shown in FIG. 4, the pinch optical mount is a three piece unit and features a plastic optical (leaf spring) mount, machined lens, and two side mount rubber gaskets (not shown). The rubber gaskets are housed inside two grooves located on either side of the mount. The optical lens is inserted into the rubber gaskets where the lens remains firmly secured by pressure. While on the tube, the small mount is repositioned as the tension between the tube and mount is relieved as the front side of the mount is pinched.

Although not shown in FIG. 6, the tips of the minitrator tubes are grooved as described in FIG. 4.

The minitrators can be assembled into a variety of experimental configurations such a titration assembly showing how the minitrator is adapted and used as a 1 mL titrator. The level of the liquid inside the titrator is viewed through the optical scale and can be approximated to three decimal places. FIG. 11 shows a typical "Boyles Law" experimental apparatus where pressure is related to the volume of a gas, and FIG. 12 shows a Charles's Law" apparatus where temperature is related to the volume of a gas.

Solvent Dispensers

The components of the dispenser, typically a solvent dispenser, is shown in FIG. 5, and is a hand held device which has several components which include a vent cap and a drain vent dispenser body and alignment marks, plunger end stop ring, rubber stopper, Luer slip-tip, and a safety cap. Unlike other dispensers which have been developed such as volumetric pipettes or solvent dispensing guns which are designed to deliver fixed or measured volumes, the present invention is the first hand held device which permits the user to dispense solvent by fixed volumes, measured volumes, or stop-flow volumes.

An o-ring is seated into a groove within the inner diameter of the vent cap (not shown in drawing) which houses a replaceable dispenser tube which is also grooved. The seal between the tube and the vent cap is air tight however, and the tube readily pops into and out of the vent cap and is free to rotate around the tube.

To dispense fixed volumes (volumes defined on the tube markings), rotate the vent cap so that it lines-up with the alignment mark on the tube.place the tip of the dispenser into the solvent and pull the plunger back to the first stop position as shown in FIGS. 13 & 14. Here, a small o-ring located near the base of the plunger is retained as it rests against the first stop inside the vent cap. To drain the solvent from the tube, pull the plunger back to the vent position as shown in FIG. 14, and the rubber stopper is pulled inside the cap leaving the vent and tube hole exposed to the atmosphere. The accuracy and reproducibility of the dispenser depends on the volume and type of dispensing and tube. Typically the reproducibility of the dispensers are comparable to Class A pipettes and dispensing guns. For a 1 milliliter dispenser, the reproducibility is 1 ml + or − 0.006 milliliters or 6 parts per thousand, while for a 5 milliliter dispenser the reproducibility typically is 5 ml. + or − 0.08 milliliters or about 2 parts per thousand.

The dispenser can be used much like a syringe to deliver measured volumes. Volumetric pipettes and many dispensing guns are designed to deliver only single volume quantities.

The dispenser can also be used in the stop-flow mode by finger tip control, push button valve control, or by auto feed control. To dispense stop-flow volumes by finger tip, fully charge the tube with solvent by pulling the plunger back to the vent position while placing your index finger on the vent hole. When the index finger is removed, the solvent flows is started, and when the finger is placed onto the vent hole, the flow is stopped.

The flow rate can be adjusted by changing the diameter of the dispenser tip, i.e. tips with smaller inner bore diameters yield slower solvent flow rates, or by turning the vent hole away from the alignment mark on the tube which acts to partially close the vent as it is rotated away from the alignment mark.

To dispense solvents using auto-feed control, adjust the flow by turning the vent cap, place the index finger on the vent hole and charge the tube with solvent. When the finger is released from the vent hole, the solvent flows at a steady rate from the tip of the dispenser.

Calorimeter

As shown in FIG. 6, the calorimeter is designed to measure thermodynamic parameters such as heat capacities and thermochemical heats; of reactions; however, this calorimeter is designed to be inexpensive, durable,a nd used with small volumes (20 milliliters or less). The calorimeter casing is constructed using high impact resistant plastic and has a polystyrene insulating layer and a thin walled plastic cup which protects the insulating material from chemical attack and has a low thermal absorption. The calorimeter also contains a stirring ring which is fitted with a replaceable stirring rod and a cap which houses a thermometer, stirring rod, and an injection port which couples to other components of the present invention.

In addition the calorimeter can be used to as a gas generating vessel where gas can be generated inside the retainer by chemical means and then collected inside the reactor tube which is connected to the injection port. The calorimeter can be used as a reservoir for solvents and other chemicals of the present invention which are used during reaction by inserting stem into the calorimeter through the injection port and connecting to other components of the present invention.

Typical Assemblies

Because of the modular design of the miniaturized multipurpose test kit, there are virtually limitless number of experimental configurations that can be assembled. FIGS. 15 & 16, show the electrochemical subsystems which can set-up as a voltaic cell FIG. 15, or as electrolytic cell, FIG. 16. The electrodes can be made of any suitable materials such as metals or non-metals and are inserted into both ends of the cell through the back side of the reactor caps. The electrolytic cell contains a disk which is fitted with a high impedance (mega ohms) ceramic frit, or a tube which is filled with low impedance (ohm) material, a mixture of salt and water based gel. The half cell volumes are about 0.15 milliliters and the electrodes and solutions can be quickly changed, making the system fast and efficient to employ.

The electrolytic cell as shown in FIG. 16, can be used to perform experiments such as plating or amperometry. The vent caps in this set-up are open to allow for gases to escape during electrolysis.

FIGS. 17 & 18 show the precipitator and filtering assembly. The reactor cap is fitted with a filter cap which can be placed either inside or outside the reactor vessel. The precipitate is formed inside the vessel and excess solvent and wash is removed by suction, using a vacuum system or syringe. The precipitate is dried by placing one end of the reactor tube into a cradle (heating cradle) which is heated to about 130° (for drying water) while the other end of the reactor vessel is connected to a vacuum. The heat raises the vapor pressure of the liquid while the vacuum removes excess solvent and lowers the vapor pressure of the liquid. Figure shows the pycnometer which is used to measure density.

The invention will be described for the purposes of illustration only in connection with certain embodiments; however, it is recognized that those persons skilled in the art may make various changes, modifications, improvements and additions on the illustrated embodiments all without departing from the spirit and scope of the invention.

BRIEF DESCRIPTION OF THE DRAWINGS

FIG. 2 is a schematic illustration of the components of the multipurpose miniature test kit of the present invention.

FIGS. 2b-1, 2b-2, and 2b-3 are enlarged views of FIG. 2b which show the reactor cap 22, including o-rings 144 and an insertion shaft 58 having grooved rings 59.

FIG. 3 is a side illustration of a sliding optical mount minitrator of the present invention.

DETAILED DESCRIPTION OF THE PREFERRED EMBODIMENT

Figure 1:
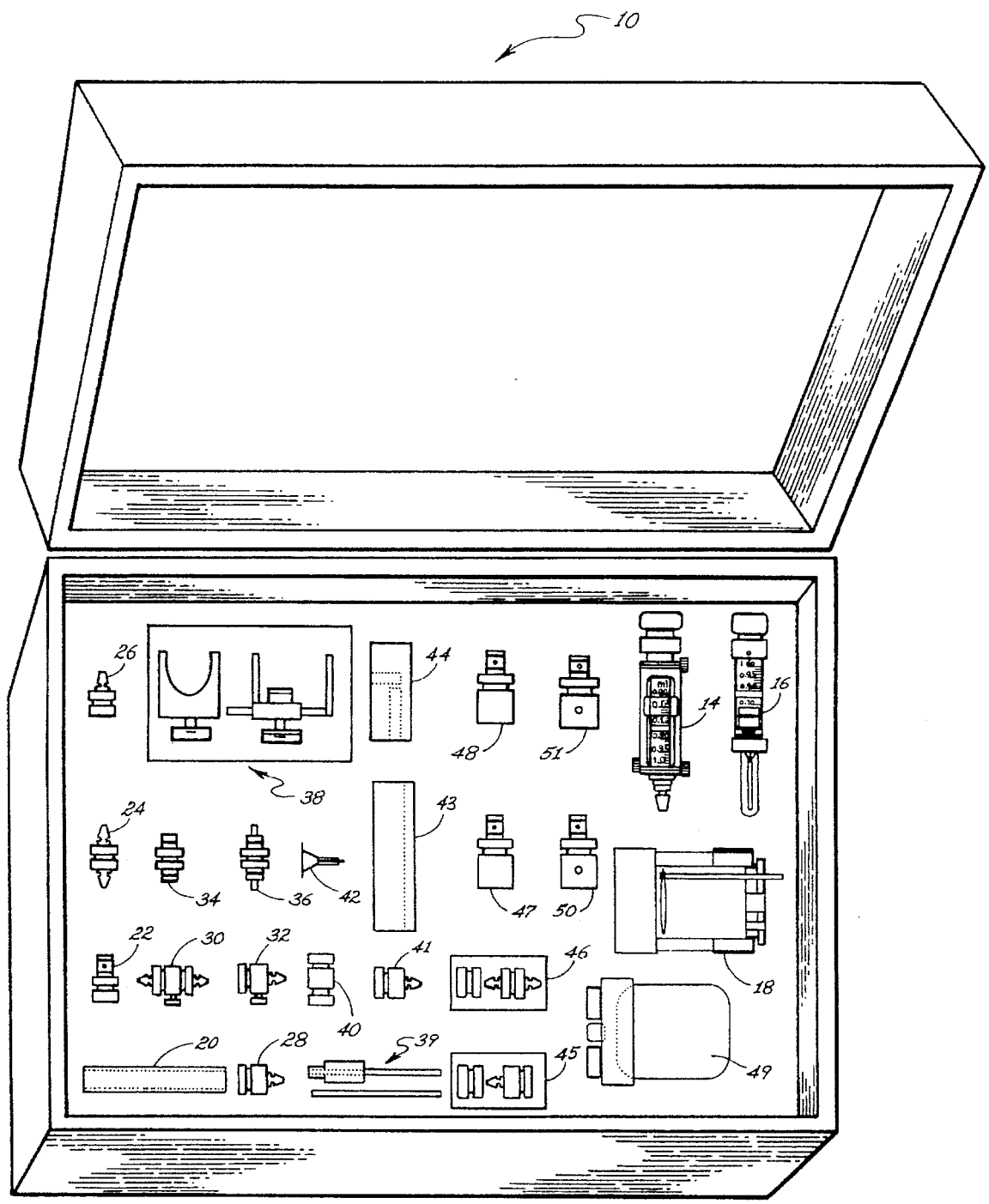
FIG. 1 is a perspective illustrative view, from above of a test kit for containing components of the miniaturized multipurpose test kit, for carrying out the test methods of the invention showing the components contained therein.
Figures 1, 2B:
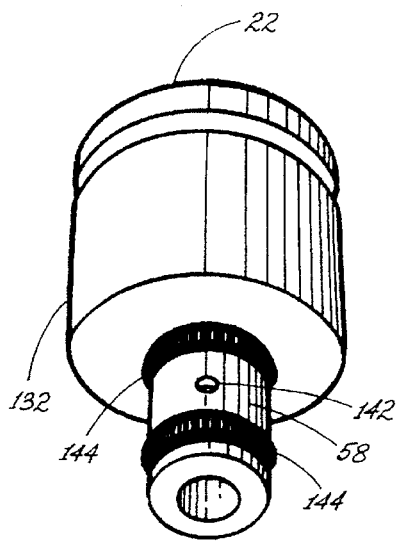
Figures 2, 2B:
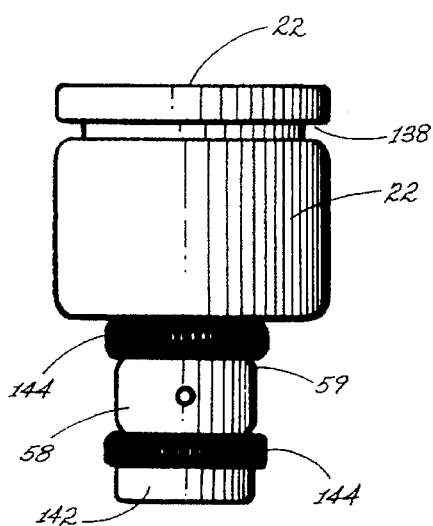
Figures 2, 2B, 3:
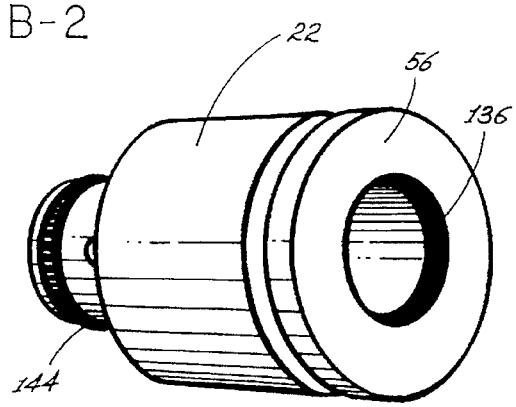
Figure 3:
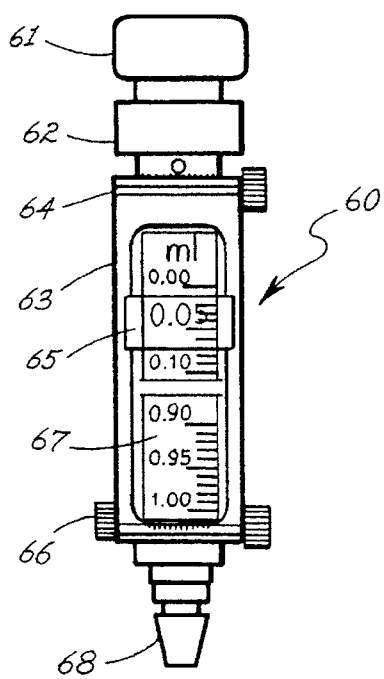
Figure 5:
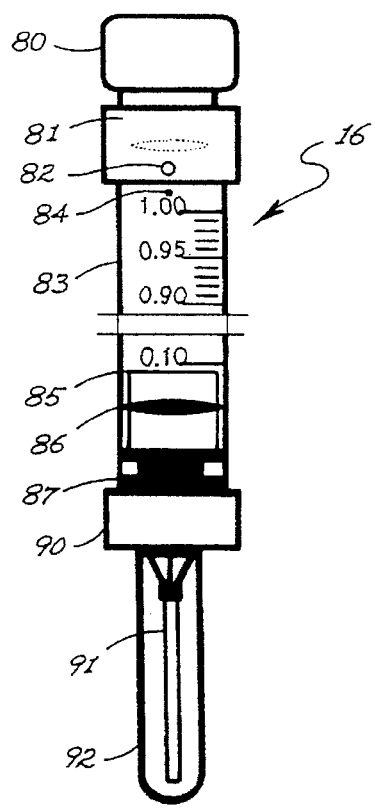
FIG. 5 is a schematic side illustration of the solvent dispenser of the present invention.
Figure 6:
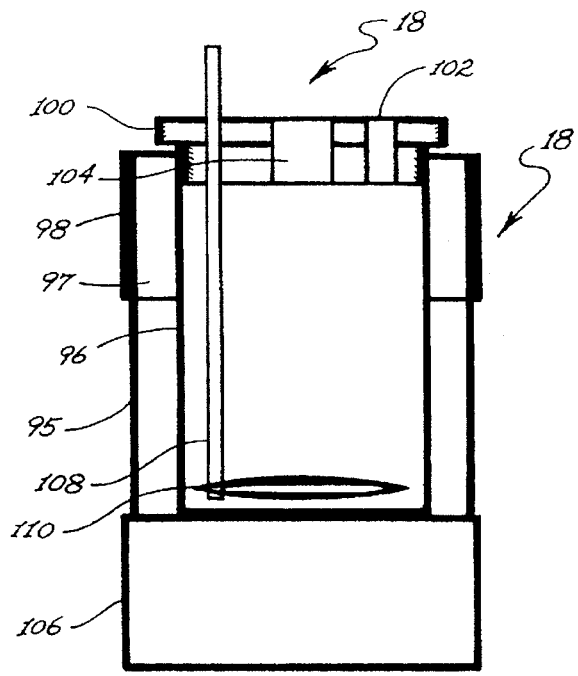
FIG. 6 is a schematic illustration of a calorimeter of the present invention.

Referring to the drawings, a test kit 10 is shown in FIG. 1 for containing components of the multipurpose miniature test kit, shown generally as 12 in FIG. 2, and a sliding mount minitrator 60 in FIG. 3, a dispenser 16 shown in FIG. 5 and a calorimeter 18 in FIG. 6.

Referring to FIG. 1, there is shown a test kit 10 containing components shown generally at numeral 12 of the multipurpose miniature test kit with components being shown in detail in FIGS. 2a through 2w. FIG. 2a–w of a reactor tube include a reactor tube 20, a reactor cap 22, a male/male coupler 24, a vacuum cap 26, a filter adapter 28, a male/male stopcock 30, a male/female stopcock 32, and E-cell bridge coupler high impedance 34, an E-cell bridge coupler low impedance 36, an adjustable ring clamp 38, a stem and stem adapter 39, a female/female coupler 40, a male/female coupler 41, and the electrode 42, a tube heating cradle 43, a thermometer cradle 44, a stem cap coupler 45, a male/male coupler 46, a side mount reactor cap 47, a double access reactor cap 48, a quadruple access cap 50, a triple access reactor cap 51, a reactor base vessel 53, a reactor screw vent 65.

Referring to FIG. 3, the sliding mount minitrator 60 includes plunger handle 61, mounted on a pull-stop valve 62, a one piece tube holder and sliding optical mount 63, including a lens adjustment screw 64, an optical lens 65, and a tube fastening screw 66. Said tube holder is mounted on the minitrator tube 67, having a distal end including a minitrator tube connecting tip 68.

Figure 4:
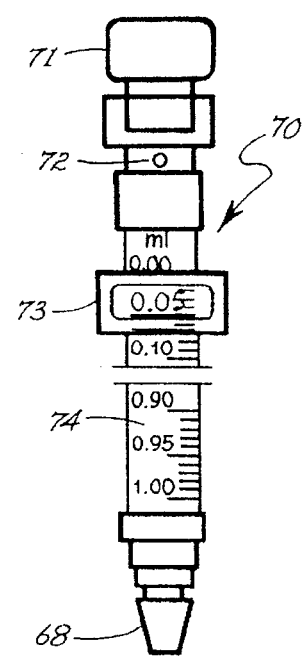
FIG. 4 is a schematic side illustration of a pinch optical mount minitrator of the present invention.

Referring to FIG. 4, there is shown a pinch optical mount minitrator 70, including a plunger handle 71, mounted in a pull stop valve 72, with a sliding-pinch optical mount 73, mounted on a syringe body 74, typically constructed of laminated plastic, with a minitrator tube connecting tip 68, mounted at the distal end of said syringe body.

Referring to FIG. 5, there is shown a solvent dispenser 16, including a plunger handle 80, a vent cap 81, including a drain vent, 82 having a dispenser body 83, of laminated construction including an alignment mark 84, an including a plunger 85, and a stop ring 86, and a rubber stopper 87, mounted in the said dispenser body, there being an open section 88, provided in the said dispenser body. There is included at the distal end of dispenser body 83 is a lure tip adapter 90 including a dispenser tip 91, and provided with a safety cap 92. There is shown in FIG. 3 a calorimeter 18, having a high impact sheath, calorimeter 95, mounted on a thin walled cup 96, having thick insulation member 97, having a polypropylene cap 98 mounted on the top portion of said cup, including a calorimeter cap and seal and sheath 100, including an injection port 102, and a thermometer coupler 104. The polypropylene cap 98 is mounted on a base member 106, and includes a stirring bar 108, including a stirring ring 110.

Figure 7:
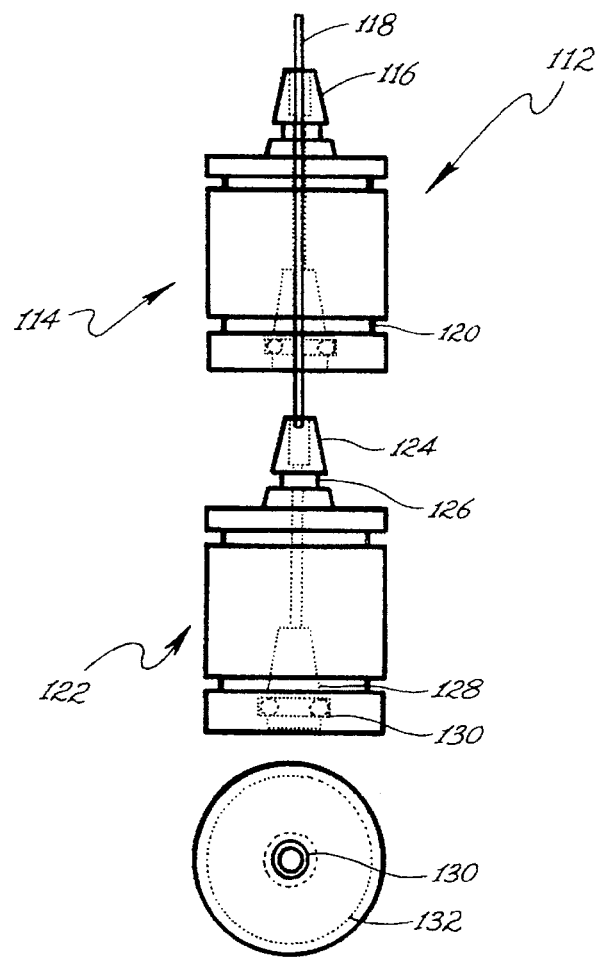
FIG. 7 is a schematic illustration of the pop-in pop-out fastening apparatus according to the invention showing component A in side view, component B in side view, and showing the socket bottom view.

Referring to FIG. 7, there is shown a pop-in pop out fastening system shown generally at 112, including a component A 114, having a nipple 116, including an inserted cylinder 118, and having a grooved ring 120. There is also shown component B in a side view 122 having a nipple(male fitting) 124, and an adjacent groove 126, a socket(female fitting) 128, is provided at the base of said component B, and an interior o-rings 130 is also provided in the base together with a groove ring 132.

Figures 8, 9:
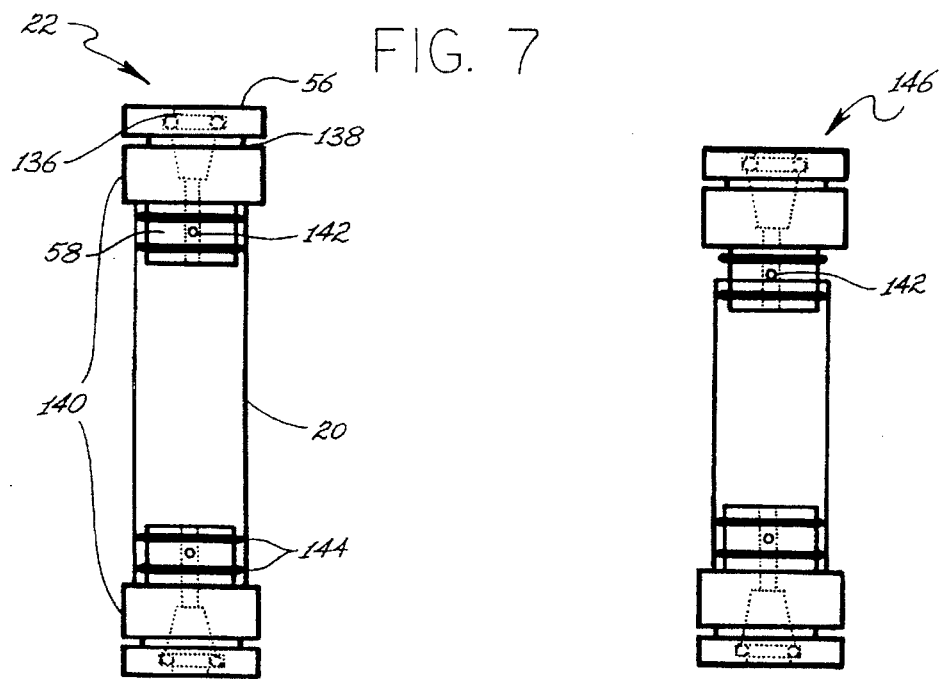
FIG. 8 is a schematic illustration of the reactor caps and tube joints of the present invention showing the small port in the closed position.
FIG. 9 is a schematic illustration of the reactor and tube joints of the present invention with the small port in the open position.

Referring to FIG. 8, there is shown a reactor cap 22, having a large port 136, and grooved ring 138, a plurality of reactor caps 140, a small port vent 142 (shown in the closed position), a plurality of o-rings 144 each positioned in a grooved ring 59 on insertion shaft 58' mounted in a reactor tube 20. There is also shown in FIG. 9, a reactor cap 22 having a large port 136 and grooved ring 138, a plurality of reactor caps 140, a small port 142 shown in the open position, a plurality of o-rings 144 mounted in a reactor tube 20, and a tube joint 146, showing the small port 142, in the open position.

Figure 10:
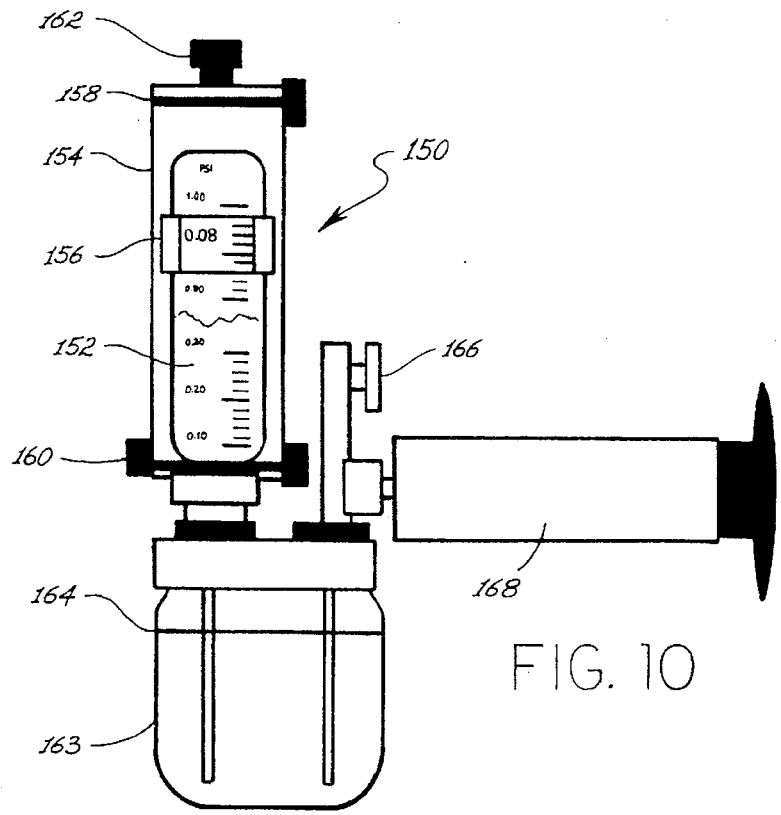
FIG. 10 is a schematic illustration of the minitrator-titration assembly according to the invention.

There is shown in FIG. 10, a minitrator pressure-volume apparatus performing the "Boyle's Law" experiment including and shown generally as 150, including a manometer tube 152, on which is mounted a one piece tube holder & sliding optical mount 154, including an optical lens 156, a lens adjustment screw 158, a tube fastener screw 160, having a pull stop valve 162. The said manometer tube is mounted on a reactor vessel 163 shown with a liquid level 164 at a selected level, mounted on the said reactor base in association with a syringe 168.

Figure 11:
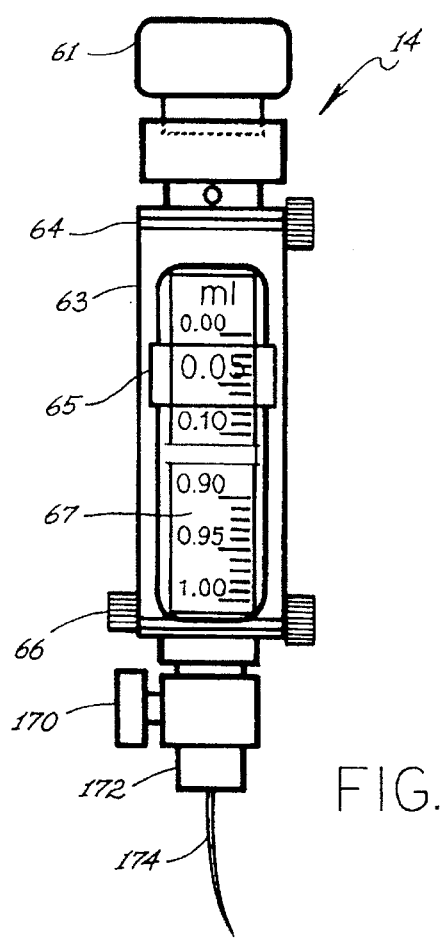
FIG. 11 is a schematic illustration of the minitrator-pressure/volume apparatus "Boyle's Law."

Referring to FIG. 11, there is shown a minitrator-titration assembly 14, as shown in FIG. 3, provided with a male-female stopcock 170, a Luer-Tip Adapter 172, having a fine point tip 174.

Figure 12:
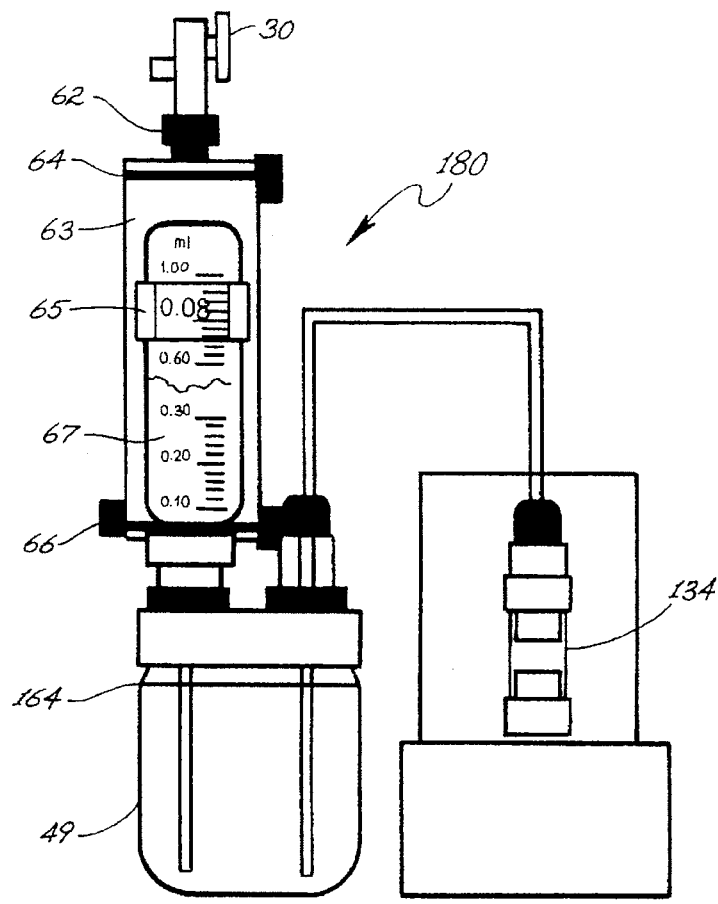
FIG. 12 is a schematic illustration of a minitrator volume-temperature assembly, for demonstrating "Charles Law" shown in an exploded view, according to the invention.

Referring to FIG. 12, there is shown a minitrator volume-temperature assembly 180 for demonstrating the operation of "Charlie's Law."

Figure 13:
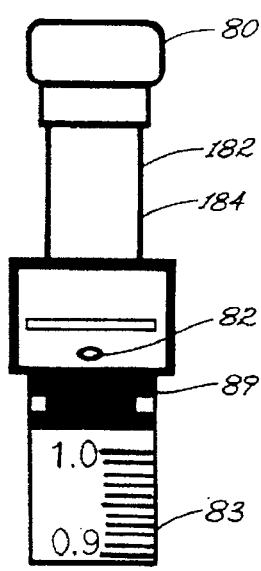
FIG. 13 is a schematic illustration of the solvent dispenser in the first stop position according to the invention.
Figure 14:
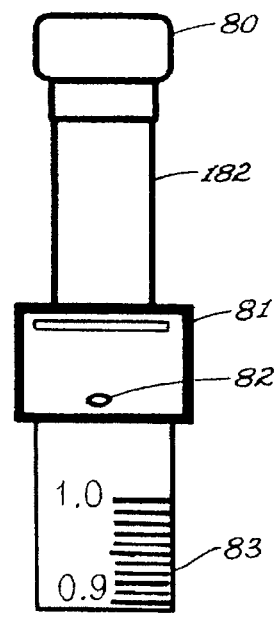
FIG. 14 is a schematic illustration of a solvent dispenser in the vent position of the invention of FIG. 13.

Referring to FIG. 13, there is shown the solvent dispenser as shown in FIG. 5 shown in the first stop position 89, with the dispenser handle with the plunger 182 out to the first stop shown at 184, shown with the bottom of rubber stopper stopped from halfway mark to the top of the 1.0 cc mark on dispenser tube. Referring to FIG. 14, there is shown the solvent dispenser of FIG. 5, shown in the vent position with the plunger 182, fully out and in the event open position, wherein the black rubber stop is located above said vent cap.

Figure 15:
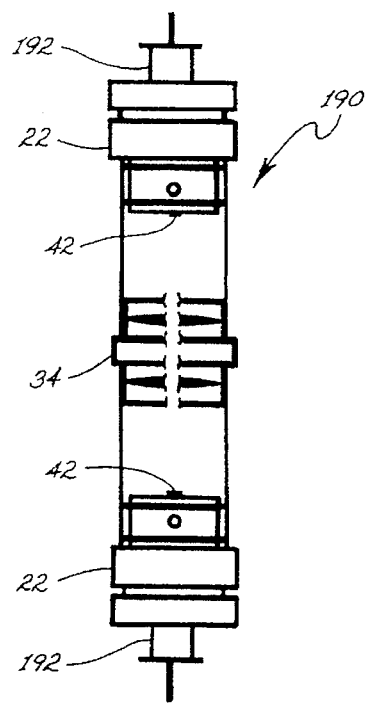
FIG. 15 is a schematic illustration of an electromechanical assembly for a voltaic cell, according to the present invention.

Referring to FIG. 15, there is shown a electromechanical assembly shown for a voltaic cell 190, including contacts 192, a reactor cap 22, an electrode 42, a bridge 34, a rector tube 20, a bottom electrode 42, a second reactor cap 22, and a second contact 192.

Figure 16:
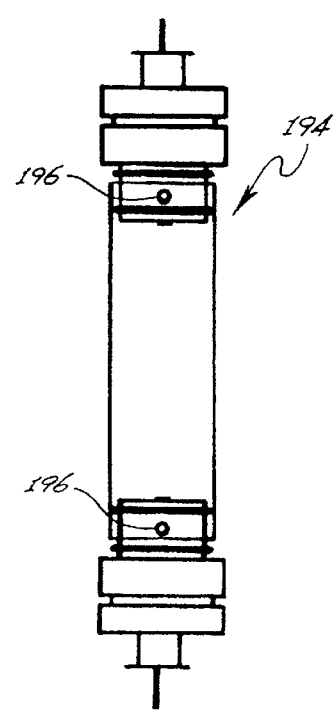
FIG. 16 is a schematic illustration of an electromechanical assembly for an electrolytic cell according to the present invention.

As seen in FIG. 16, there is shown an electrolytic cell 194, shown with the gas vent open at 196.

Figure 17:
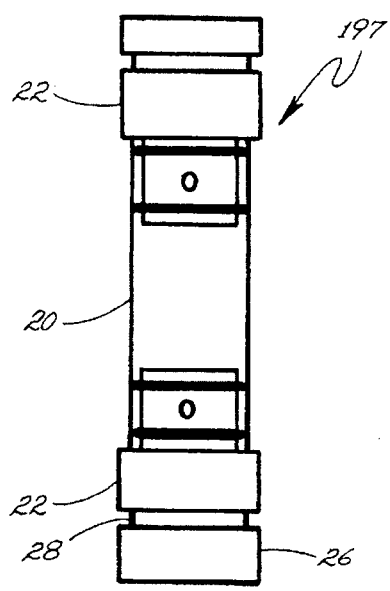
FIG. 17 is a schematic illustration of a precipitate assembly including a precipitate reactor according to the present invention.

There is shown in FIG. 17, a precipitate reactor 197, including a reactor cap 22, mounted on a reactor tube 20, having a second reactor cap 22 at the base end, including a filter frit mounted in filter adapter 28 at a vacuum cap 26.

Figure 18:
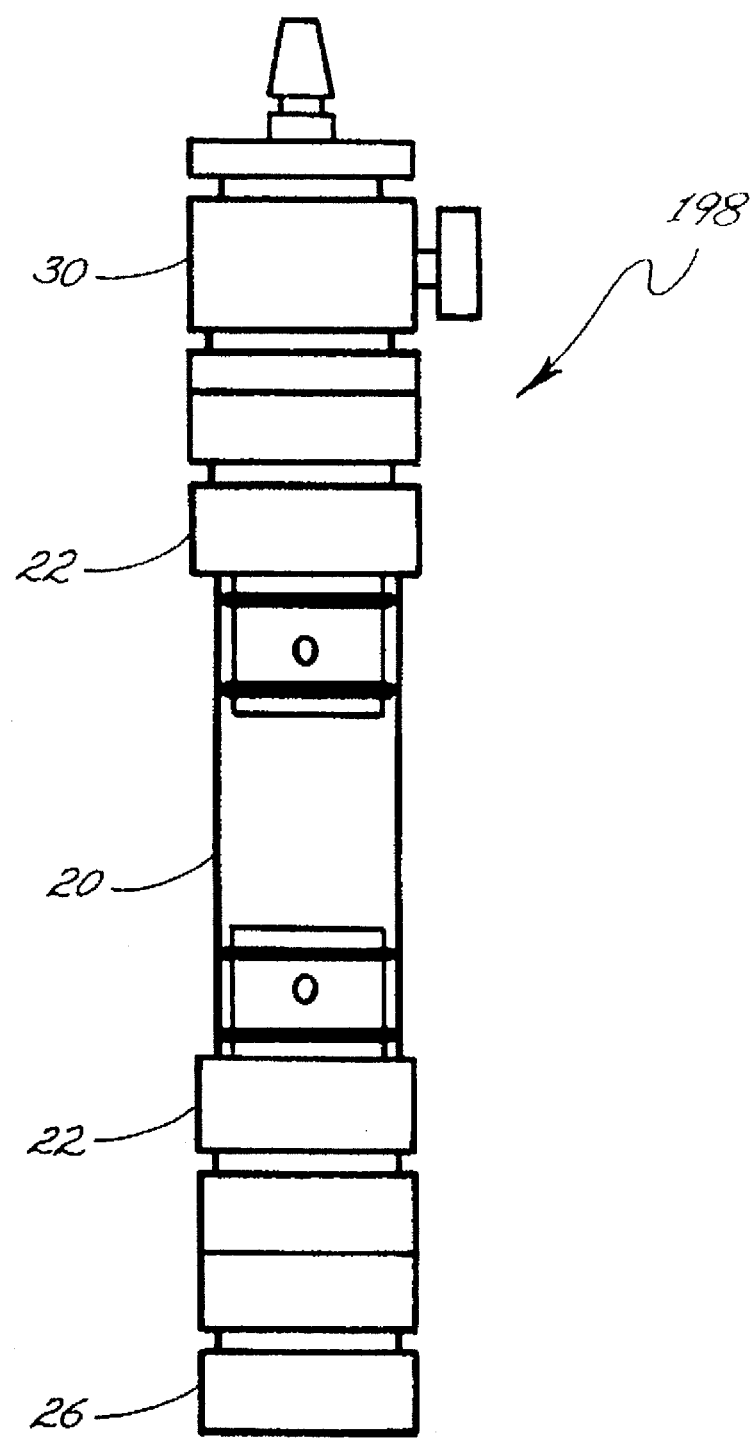
FIG. 18 is a schematic illustration of a density assembly showing a pycnometer, according to the present invention.

In FIG. 18 there is shown a pycnometer 198, including a reactor tube 20, atop and bottom mounted reactor caps 22, a bottom mounted vacuum cap 26, and a male-male stopcock 30.

Figure 19:
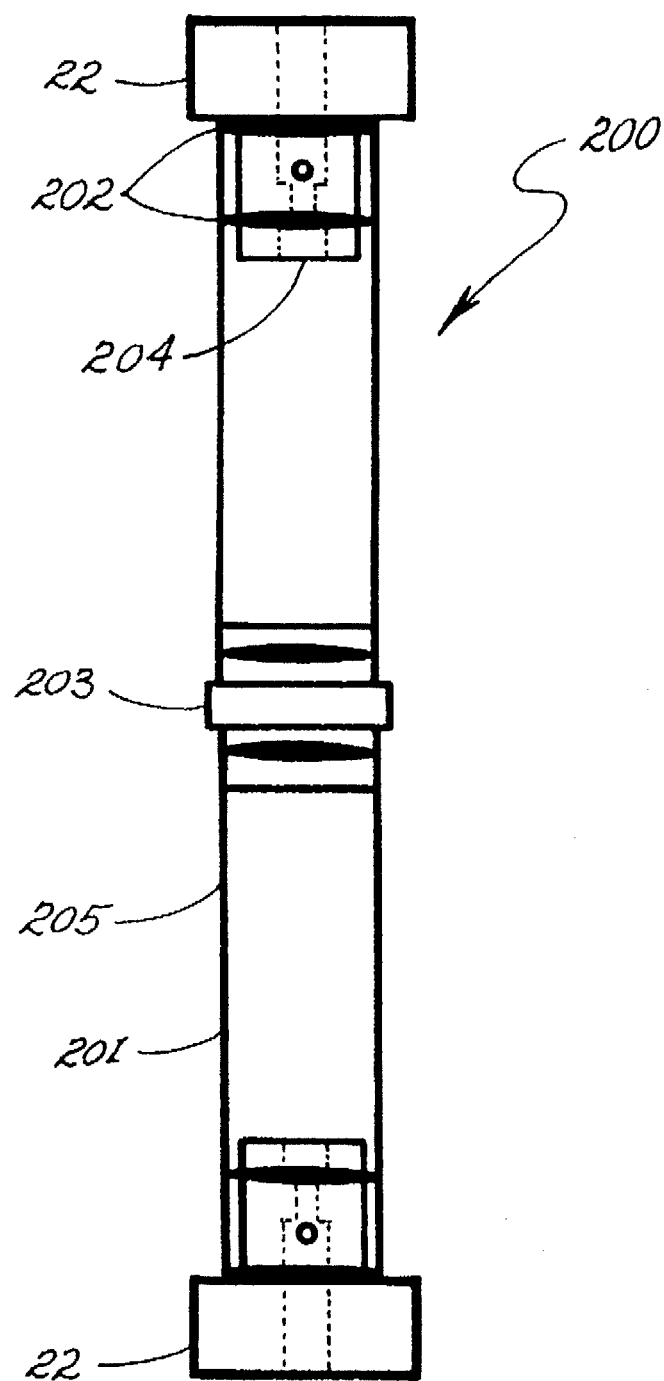
FIG. 19 is a schematic illustration of a electromechanical voltaic cell showing a small volume calorimeter according to the present invention.
Figure 20:
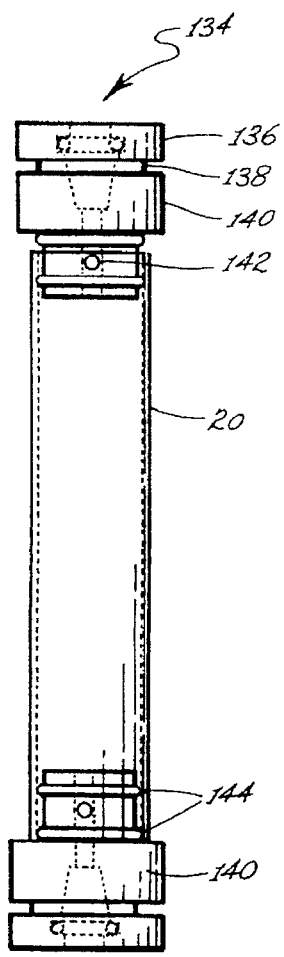
FIG. 20 is a side elevational view of FIG. 9.
Figure 21:
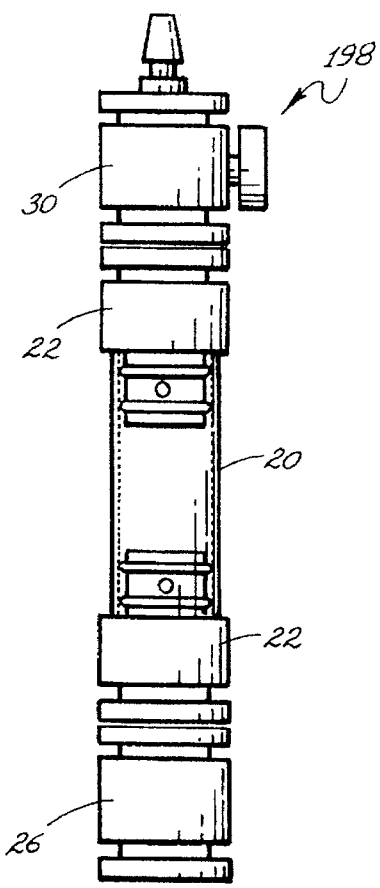
FIG. 21 is a side elevational view of FIG. 18.
Figure 22:
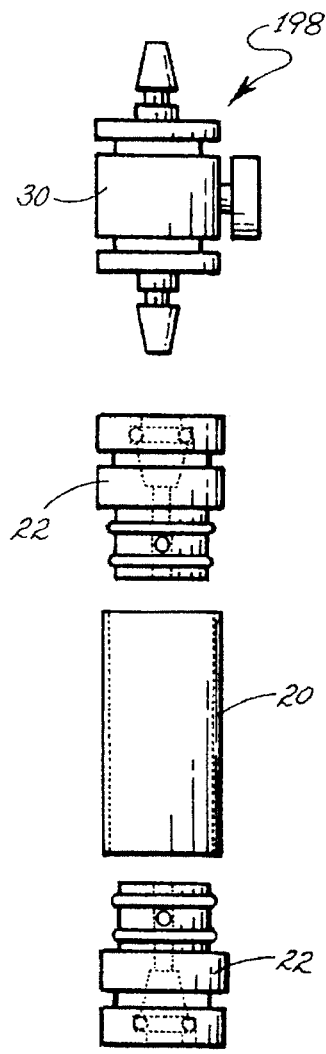
FIG. 22 is an exploded side elevational view of FIG. 18.

There is shown in FIG. 19, a small volume calorimeter tool 200, having reactor caps 22 having o-rings 202 and passage 204, mounted at opposite ends of aground glass tube 201, with an electromechanical bridge 203, dividing the ground glass tube into a solution chamber 205.

The invention furtherprovides for a method of connecting the components 12 of the test kit to produce a plurality of experimental test devices for performing experiments.

What is claimed is:

1. A modular laboratory system comprising: equipment modules and associated coupling means wherein said coupling means are employed, without employing tubular nuts, to provide a compression fitting or barb fittings adapted to slide into soft tubing or threaded fittings, such as pipe fittings for sealably connecting said modules to provide an enclosed laboratory for conducting a plurality of experiments and procedures, wherein the equipment modules comprise enclosed component body means, enclosed reactor means, and interconnector means;

a) said enclosed component body means for transferring volumes of fluids wherein said transferring is accomplished without employing beakers or flasks, said component body means having at least one access means;

b) said enclosed reactor means for receiving and containing fluids, wherein said receiving in said enclosed reactor means is accomplished without employing beakers or flasks or graduated cylinders, said enclosed reactor means consisting of tube means having a first end and a second end constructed of transparent, or chemically nonreactive tubular material for providing an inlet or outlet, each end being provided with a removable reactor cap means, said reactor cap means for enclosing the inlet and the outlet of the reactor tube means to provide a reactor cell for conducting fluid experiments and procedures in an enclosed vessel, said reactor cap means comprising:

i) a first reactor cap having an insertion shaft member for extending into the first end of said tube means for sealing and for anchoring the reactor cap in firm engagement with the tube means including at least two grooved rings longitudinally spaced with respect to the tube ends with each grooved ring adapted to accommodate an o-ring for compressively engaging an inner wall of the tube means, said reactor cap having a central access passage extending longitudinally through the reactor cap from a pop in/pop out female socket positioned on the reactor cap;

ii) a second reactor cap having an insertion shaft member for extending into the second end of said tube means for sealing and for anchoring said second reactor cap in firm engagement with the tube means including at least two grooved rings longitudinally spaced with respect to the tube ends with each grooved ring adapted to accommodate an o-ring for compressively engaging an inner wall of the tube means, said second reactor cap having a central access passage extending longitudinally through the reactor cap from a pop in/pop out female socket positioned on the the reactor cap; said associated coupling means comprising:

c) nipple-socket joint means for linking and un-linking equipment modules of the modular laboratory system, said nipple-socket joint means having a first nipple element provided on a first module, wherein said first nipple element is adapted to fit snugly into a socket of a second module for compressive engagement and an o-ring seal positioned in the socket adapted to fit snugly around a groove in the nipple to provide seal means without employing threaded fittings or compression rings; and d) a dispensing means for dispensing volumes of fluid solvent, wherein said fluid volumes are transferred within the equipment modules in an enclosed environment with minimal contact with a user, reduced adverse environmental impact and with smaller amounts of chemical waste produced.

2. The modular laboratory system of claim 1 wherein the nipple socket joint means includes a first nipple element and a second socket element used to couple and uncouple equipment modules including component body means and reactor means to provide an air tight, solvent tight, fully supported, stand alone laboratory system.

3. The modular laboratory system of claim 1 wherein the component body means includes control means consisting of:

a) indicating means for accurately indicating volumes of fluid in the component body means precision marked and calibrated against standard test equipments, said indicating means being laminated to protect the calibrated markings against scuffing, scratching and chemical attack; and b) manual control means for accurately controlling transfer of fluid volumes.

4. The modular laboratory system of claim 3 wherein the component body means comprise a solvent dispenser employed as a hand held device comprising a vent cap, a drain vent, a dispenser body having alignment marks, a plunger end stop ring, rubber stopper, luer slip-tip, and a safety cap wherein the solvent dispenser is employed to selectively dispense solvent by fixed volumes, measured volumes and by stop-flow volumes, wherein the vent cap houses a replaceable dispenser tube precision marked and including an airtight seal between said dispenser tube and the vent cap, whereby the solvent dispenser is adapted to dispense fixed volumes defined by the tube markings, and wherein the accuracy and reproducibility of the solvent dispenser depends on the volume and type of dispensing tube, therefore for a 1 milliliter dispenser, the reproducibility is 1 ml. + or − 0.006 milliliters or 6 part per thousand and for a 5 milliliter dispenser the reproducibility typically is 5 ml. + or − 0.8 milliliters or about 2 parts per thousand.

5. The modular laboratory system of claim 3 wherein the component body means comprises an enclosed sliding mount minititrator pressure/volume assembly having:

a) a full-scale optical mount adaptor having a sliding optical lens element mounted inside a plurality of grooves, typically two grooves, on either side of a housing element having a bottom screw located to the left hand side of said housing used to secure a tube member inside the mount while the screws on the right hand side are used to adjust slide tension of a lens member and to prevent sliding of said mount, said tube member is adapted for measuring volume, pressure and vacuum and can be easily changed by being popped in or removed from the mount, wherein said tube member is precision marked and calibrated against standard test equipment, said tube member being laminated to protect the calibrated markings against scuffing, scratching and chemical attack; and b) a pull-stop valve is provided to vent the tube member and thereby to vent the system for liquids or gases adapted such that when a plunger element is pulled to a stop position the vent is open and when the plunger is pushed to the closed position, when the plunger is inserted inside the tube member, the vent is in the closed position.

6. The modular laboratory system of claim 1 wherein each of said reactor caps is configured to couple said reactor tube means, to form an air and solvent tight seal, wherein said reactor cap provides support for aligning the coupled reactor tubes together, said reactor cap being constructed of plastic material, and fitted with two o-rings, a first o-ring located adjacent to the base of said reactor cap and a second o-ring in spaced relationship with said first o-ring and positioned along the insertion shaft member.

7. The modular laboratory system of claim 6, wherein each of said reactor caps includes a transverse hole, wherein when said reactor cap is fully inserted into a reactor tube means, said transverse access hole is sealed to the environment and both o-rings form an airtight seal with the inner diameter of the reactor tube and the second o-ring which is positioned at the base of the insertion shaft member also serves to eliminate trapped solvent and thereby maintain the accuracy and precision of a procedure.

8. The modular laboratory system of claim 5, wherein each of said reactor caps includes a transverse access hole which can be exposed to the environment by pulling the reactor cap about ⅓ way out, while the first and second o-rings maintain the seal in the reactor tube, thereby permitting venting of liquids and gases, the addition or removal of small quantities of solids, and the attachment of a thermocouple means.

9. The modular laboratory system of claim 1, wherein the central access passage of each of said reactor caps provides a port adapted to receive stem elements, thin cylinder elements, and probe elements wherein said central access passage extends through each of said reactor caps into the interior of the reactor tube means.

10. The modular laboratory system of claim 1, wherein the interconnector means provides for interconnection of elements of the modular laboratory system includes at least one male coupler; vacuum-pressure cap; filter adapter, male/male stopcock, male/female stopcock, E-cell bridge coupler high impedance, E-cell bridge coupler low impedance, adjustable ring clamp, stem and stem adapter, female/female coupler, male/female coupler, electrode, tube heating cradle, thermometer cradle, side mount reactor cap, double access reactor cap, triple access reactor cap for forming modular sub-system means assembled by selectively interconnecting said component body means by coupling said nipple socket joints.

11. The modular laboratory system of claim 5 wherein the sliding mount minitrator comprises plunger handle mounted on a pull stop valve, a one-piece tube holder and sliding optical mount, including a lens adjustment screw, an optical lens, and a tube fastening screw and said tube holder is mounted on a manometer tube.

12. The modular laboratory system of claim 4 wherein the solvent dispenser comprises a plunger handle, a vent cap, and a drain vent; said solvent dispenser, having a dispenser body of laminated construction including an alignment mark, a plunger, a stop ring, and a rubber stopper mounted in said dispenser body, and included at the distal end of the dispenser body a luer tip adapter and a dispenser tip with a safety cap.

13. The sliding mount minitrator of claim 5 wherein the sliding mount minitrator comprises a plunger handle mounted on a pull stop valve with a sliding-pinch optical mount mounted on a syringe body typically constructed of laminated plastic with the minitrator tube connecting tip mounted at the distal end of said syringe body.

* * * * *